(12) United States Patent
Schlipf et al.

(10) Patent No.: US 10,988,238 B2
(45) Date of Patent: Apr. 27, 2021

(54) FLIGHT CONTROL SURFACE ASSEMBLY

(71) Applicant: Airbus Operations GmbH, Hamburg (DE)

(72) Inventors: Bernhard Schlipf, Hamburg (DE); Peter Lücken, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 325 days.

(21) Appl. No.: 16/230,146

(22) Filed: Dec. 21, 2018

(65) Prior Publication Data

US 2019/0210712 A1 Jul. 11, 2019

(30) Foreign Application Priority Data

Dec. 29, 2017 (DE) ...................... 10 2017 131 451.2
Nov. 14, 2018 (DE) ...................... 10 2018 128 555.8

(51) Int. Cl.
*B64C 13/50* (2006.01)
*B64C 9/20* (2006.01)
(Continued)

(52) U.S. Cl.
CPC ................ *B64C 13/50* (2013.01); *B64C 3/38* (2013.01); *B64C 9/02* (2013.01); *B64C 9/20* (2013.01);
(Continued)

(58) Field of Classification Search
CPC .. B64C 13/50; B64C 3/38; B64C 9/02; B64C 9/20; B64C 9/26; B64C 13/503; B64D 45/0005; B64D 2045/001
See application file for complete search history.

(56) References Cited

U.S. PATENT DOCUMENTS 5,628,477 A * 5/1997 Caferro ..................... B64C 9/02
244/195
5,686,907 A * 11/1997 Bedell ................ B64D 45/0005
244/194
(Continued)

FOREIGN PATENT DOCUMENTS

EP 2095 933 A1 1/2016
GB 2 469 910 A 11/2010
(Continued)

OTHER PUBLICATIONS

Extended European Search Report for Application No. 18214735.5 dated Mar. 13, 2019.
(Continued)

*Primary Examiner* — Rodney A Bonnette
(74) *Attorney, Agent, or Firm* — Jenkins, Wilson, Taylor & Hunt, P.A.

(57) ABSTRACT

A flight control surface assembly for mounting to a main wing of an aircraft includes flight control surfaces side by side with a gap between each two of them, a connection assembly for movably connecting the flight control surfaces to the main wing to be selectively movable in a predetermined synchronous movement between retracted and extended positions, a drive arrangement operable to effect predetermined synchronous movement, and a control unit connected to the drive arrangement to control the drive arrangement. The flight control surface assembly includes for each gap a separate pair of electrical components with a first electrical component and a second electrical component fixedly mounted to a another one of the two flight control surfaces separated by the gap. The first and second electrical components of each pair are configured to wirelessly transfer electrical energy over the gap.

15 Claims, 6 Drawing Sheets

(51) Int. Cl.
*B64C 9/26* (2006.01)
*B64D 45/00* (2006.01)
*B64C 3/38* (2006.01)
*B64C 9/02* (2006.01)

(52) U.S. Cl.
CPC .............. *B64C 9/26* (2013.01); *B64C 13/503* (2013.01); *B64D 45/0005* (2013.01); *B64D 2045/001* (2013.01)

(56) References Cited

U.S. PATENT DOCUMENTS

| | | | |
|---|---|---|---|
| 6,382,566 B1 | 5/2002 | Ferrel et al. | |
| 7,354,022 B2 * | 4/2008 | Richter .............. | B64D 45/0005 244/194 |
| 8,036,783 B2 * | 10/2011 | Pohl .................. | B64D 45/0005 701/4 |
| 8,115,649 B2 * | 2/2012 | Moy ................. | B64D 45/0005 340/686.1 |
| 9,656,764 B2 * | 5/2017 | Jones ................. | B64D 45/0005 |

FOREIGN PATENT DOCUMENTS

| | | | |
|---|---|---|---|
| WO | WO 2007/065622 A1 | 6/2007 | |
| WO | WO-2020144221 A1 * | 7/2020 | ......... B64D 45/0005 |

OTHER PUBLICATIONS

Kinney, "Proximity Sensors Compared: Inductive, Capacitive, Photoelectric, and Ultrasonic," Machine Design, 8 pages total (2001).

* cited by examiner

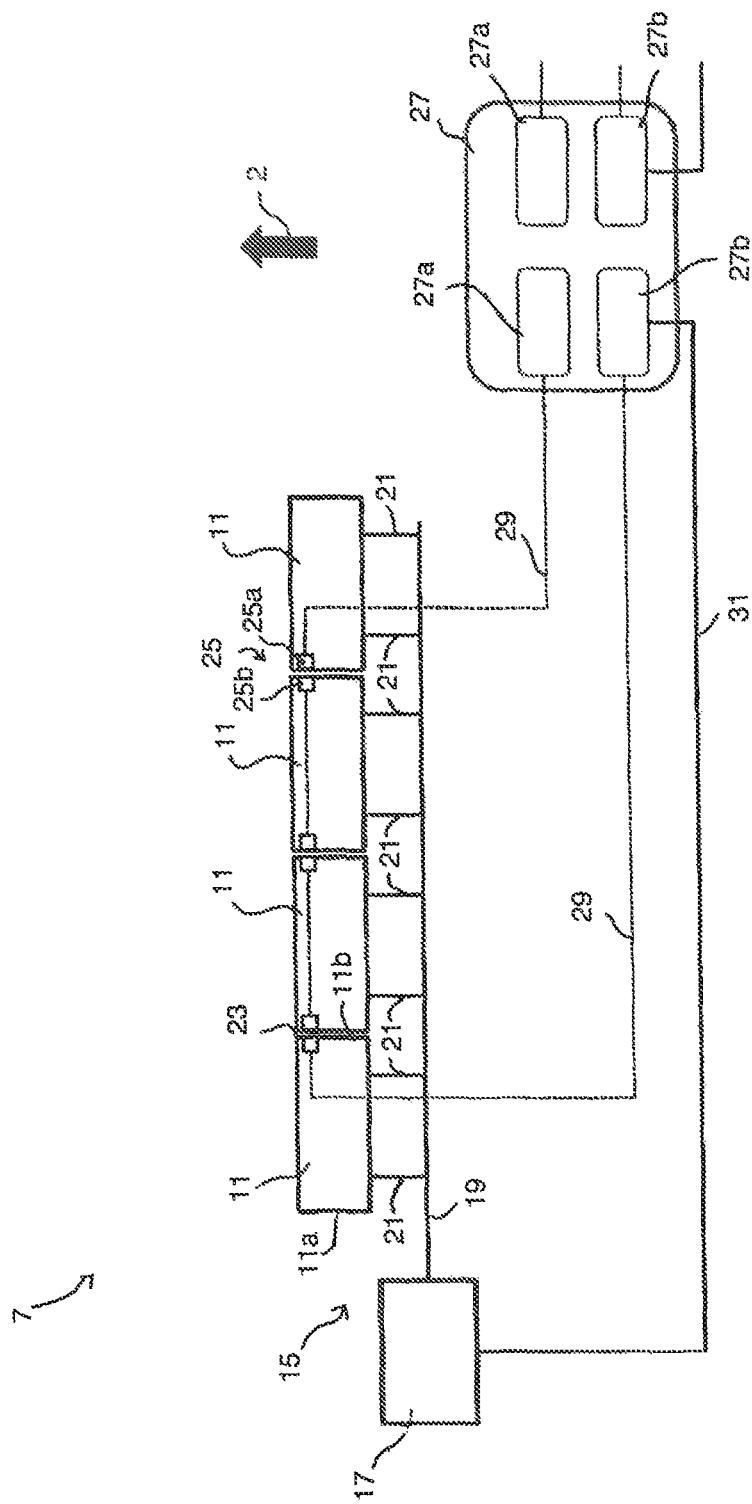

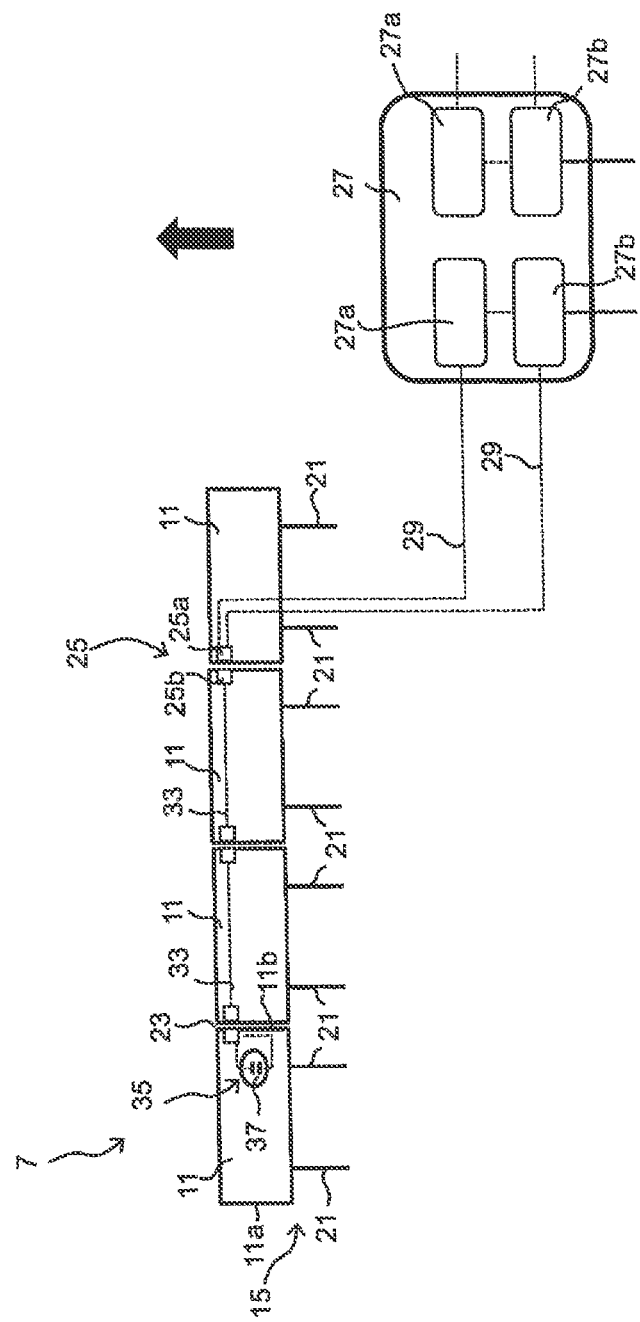

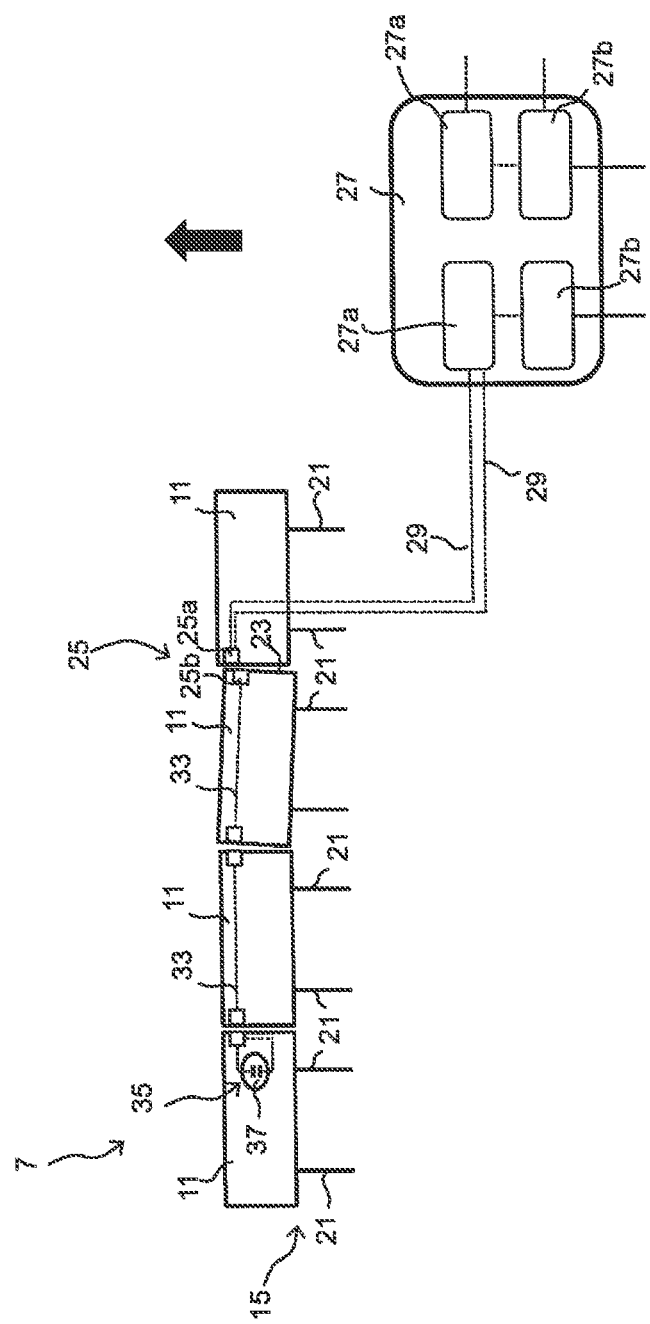

FLIGHT CONTROL SURFACE ASSEMBLY

CROSS-REFERENCE TO RELATED APPLICATIONS

This application claims priority to German Patent Application No. 10 2017 131 451.2 filed Dec. 29, 2017 and German Patent Application No. 10 2018 128 555.8 filed Nov. 14, 2018, the entire disclosures of which are incorporated by reference herein.

TECHNICAL FIELD

The present application relates to a flight control surface assembly, such as a leading edge slat assembly, which comprises a plurality of flight control surfaces having two opposite lateral edges and being arranged side by side with a gap between lateral edges of each two adjacent ones of the flight control surfaces, a connection assembly adapted for movably connecting the plurality of flight control surfaces to a main wing of an aircraft, such that the flight control surfaces are selectively movable in a predetermined synchronous movement between a retracted position and an extended position, and a drive arrangement operatively coupled to the connection assembly and operable to effect the predetermined synchronous movement of the flight control surfaces between the retracted position and the extended position.

BACKGROUND

In order to be able to selectively vary the degree of lift provided by an aircraft wing, aircraft wings are typically provided with aerodynamic or flight control surfaces which are movably coupled to a main wing such that they can be moved between a retracted or stowed position, in which they are disposed within or directly on the main wing, and at least one extended or deployed position, in which they are extended from the main wing. Slats are an example for such movable flight control surfaces disposed at and extendible from the leading edge of the main wing.

Flight control surfaces are often provided in groups of multiple flight control surfaces arranged side by side. All flight control surfaces of such a group are operatively coupled to a common drive arrangement and are adapted to be moved together between the retracted and extended positions while carrying out a common predetermined synchronous movement between the retracted and extended positions upon operation of the drive arrangement. In other words, during operation of the drive arrangement all of the flight control surfaces are moved simultaneously and in parallel and each of the flight control surfaces moves along a predetermined nominal path. This corresponds to a normal operating condition.

In order to be able to safely take up increased forces which may occur within the assembly in a fault state, in which one of the flight control surfaces deviates to considerably from the predetermined synchronous movement, the mounting structures between the flight control surfaces and the main wing are typically constructed to be of a very high reliability. However, this approach is associated with relatively high costs and with a relatively high complexity and/or weight. It is therefore generally desirable to provide for a detector arrangement which is adapted to detect the occurrence of such a fault state and to then stop any further movement of the flight control surfaces. The aircraft is able to safely fly, irrespective of the position of the flight control surfaces, albeit with a somewhat decreased efficiency.

An example of a fault state of the above type is skewing of a slat of a slat assembly. Slats are commonly mounted to the main wing by a plurality of elongate slat tracks. Each slat track is movable with respect to the main wing between a retracted position corresponding to the stowed position of the slat and an extended position corresponding to the deployed position of the slat. The movement of the slat tracks between the retracted and extended positions is effected by a drive arrangement. For example, such a drive arrangement may comprise a drive shaft, which is rotatably driven by a rotary actuator and which is coupled to each of the slat tracks via a respective transmission or gearbox converting the rotary movement of the drive shaft into a synchronous translatory movement of the slat tracks along their longitudinal extension. The connection between the slat tracks and the slats is typically realized by joints, which comprise a plurality of spherical bearings, such that some degree of movement of the slat with respect to the slat tracks is possible, so that minor changes in the position and the geometry of the slat with respect to the slat tracks can be compensated for and that there is at least some degree of decoupling between deformation of the slat and deformation of the main wing. A relative change in the position of the slat with respect to the slat tracks may occur, for example, in the event that the slat tracks coupled to a single slat are not moved synchronously, i.e. in case of a differential movement of the slat tracks, resulting in skewing of the slat, and may be accommodated by the joints configured in the above manner. However, the arrangement of spherical bearings used in the joints, typically together with multiple links, is relatively complex and expensive and assumes a considerable amount of space.

SUMMARY

It is therefore an object of the disclosure herein to provide a flight control surface assembly of the above type, which is of a simple and cost-efficient construction and which is nevertheless able to address a fault state in which one of the flight control surfaces deviates considerably from its predetermined nominal path.

This object is achieved by a flight control surface assembly, a wing of an aircraft, and an aircraft having features disclosed herein. Preferred embodiments of the flight control surface assembly are also disclosed.

According to the disclosure herein, a flight control surface assembly, which may be, in particular, a leading edge slat assembly, is provided and adapted or configured to be mounted to a main wing of an aircraft. The flight control surface assembly comprises a plurality of flight control surfaces, each having two opposite lateral edges. The two lateral edges extend perpendicularly or transversely with respect to a leading edge (in the case of the flight control surface assembly being a leading edge flight control surface assembly) or with respect to a trailing edge (in the case of the flight control surface assembly being a trailing edge flight control surface assembly), which leading or trailing edge extends between the two lateral edges. Generally, the flight control surfaces typically also comprise an upper surface and a lower surface meeting at the leading or trailing edge. The flight control surfaces are arranged side by side, such that, for each two adjacent ones of the flight control surfaces, one of the lateral edges of one of the respective two adjacent flight control surfaces faces one of the lateral edges of the other of the respective two adjacent flight control surfaces and the two respective adjacent flight control surfaces are separated by a gap. In other words, the flight control surfaces are arranged in a row with the gaps being disposed between the flight control surfaces in the direction defined by the row.

The flight control surface assembly further comprises a connection assembly adapted or configured for movably connecting the plurality of flight control surfaces to a main wing of an aircraft, such that the flight control surfaces are selectively movable in a predetermined synchronous—i.e., simultaneous and parallel—movement between a retracted or stowed position and an extended or deployed position with respect to the main wing and, in particular, a leading edge or a trailing edge of the main wing, depending on whether the assembly is a leading edge or a trailing edge flight control surface assembly. In the extended position a leading or trailing edge of the flight control surface is at a greater distance from the leading edge or trailing edge, respectively, of the main wing than in the retracted position. The predetermined synchronous movement is the movement in the normal operating state and defines for each of the flight control surfaces a nominal movement path.

Moreover, the flight control surface assembly comprises a drive arrangement, which is operatively coupled to the connection assembly and operable to effect the predetermined synchronous movement of the flight control surfaces between the retracted position and the extended position, and a control unit, which is connected to the drive arrangement and adapted or configured to control operation of the drive arrangement. Thus, when controlled by the control unit the drive arrangement, which may comprise, e.g., one or more rotary or linear actuators, linkages and/or shafts, the drive arrangement operates and thereby causes the flight control surfaces to carry out the predetermined synchronous movement. It should be noted that during flight various forces act on the flight control assembly, such as forces due to normal bending of the wings, so that the actual movement carried out by the flight control surfaces typically slightly deviates from the predetermined synchronous movement.

The flight control surface assembly also comprises, for each of the gaps, a separate pair of electrical components associated with the respective gap and with the two adjacent flight control surfaces separated by the gap, i.e. with the two flight control surfaces immediately adjacent to the gap at opposite sides thereof. Each of the pairs of electrical components comprises a first electrical component, which is fixedly mounted to one of the two flight control surfaces separated by the respective gap, and a second electrical component, which is fixedly mounted to the other one of the two flight control surfaces separated by the respective gap. The first and second electrical components of each pair are adapted or configured to wirelessly transfer electrical energy over the gap from the first electrical component to the second electrical component, i.e. they constitute cooperating energy or power transmission means for electrical energy. The amount of electrical energy transferred from the first electrical component to the second electrical component depends on a relative arrangement between the first electrical component and the second electrical component, i.e. the ratio between the electrical energy fed to the first electrical component and the electrical energy received at the second electrical component. In other words, in the example of inductive or capacitive coupling the respective coupling strength depends on such a relative arrangement. In the present application the term amount of electrical energy encompasses, in particular, the amount of electrical energy transferred between the first and second electrical components in a defined or predetermined period of time, or the electrical power transferred between the first and second electrical components.

The flight control surface assembly further comprises at least one detection circuit, i.e. one or more detection circuits. Each of the pairs is included in an associated one of the at least one detection circuit, and each of the at least one detection circuit includes one or more of the pairs. Further, each of the at least one detection circuit is electrically connected to an associated first terminal and an associated second terminal of the control unit. There may be separate first and second terminals for each of the detection circuits. The control unit is adapted or configured, for each of the detection circuits, to feed—directly or indirectly via intermediate electrical components—electrical energy to the respective detection circuit using the first terminal and possibly also the second terminal, such that upon feeding electrical energy to the detection circuit electrical energy is then wirelessly transferred between the first and second electrical components of each of the pairs included in the respective detection circuit.

The control unit is adapted or configured to measure, for each of the at least one detection circuit and upon the described feeding of electrical energy to the respective detection circuit, the value of an electrical parameter which depends on the relative arrangement between the first electrical component and the second electrical component of each of the pairs included in the respective detection circuit. Consequently, the measured value changes whenever the relative arrangement between the first electrical component and the second electrical component of one of the pairs included in the respective detection circuit changes.

The pairs of electrical components are arranged such that, for each detection circuit, during the predetermined synchronous movement of the flight control surfaces between the retracted position and the extended position the measured value of the electrical parameter is in a predetermined range limited at one end by a threshold. The range may or may not be open at the opposite end. The range and the threshold may be fixed at the time of manufacturing or may be adjustable. In any case, the threshold can be chosen to allow for slight deviations from the normal operating state due to normal forces occurring during flight, such as, e.g., vibrations or bending of the wings, without falling below the threshold. The control unit is adapted or configured to determine whether the measured value of the electrical parameter is outside the predetermined range beyond the threshold—i.e., below or above the threshold depending on the electrical parameter measured and the predetermined range—during operation of the drive arrangement and to control the drive arrangement to stop movement of the flight control surfaces when the measured value of the electrical parameter is outside the predetermined range beyond the threshold. If the measured value falls outside the predetermined range beyond the threshold this is taken as an indication of a fault state caused, for example, by one of the flight control surfaces, such as slats, being skewed. Stop movement of the flight control surfaces may in the simplest case be effected by stopping and preferably locking the drive arrangement.

For example, in a preferred embodiment each of the pairs of electrical components the first electrical component and the second electrical component are electrically connected in series—with the respective gap in between—in a detection circuit between a first and a second terminal of the control unit. The control unit is adapted or configured, for each detection circuit, to feed—directly or indirectly via intermediate electrical components—electrical energy from the first terminal towards the first electrical component and receive at the second terminal—directly or indirectly via intermediate electrical components—electrical energy from the second electrical component. In particular, as will be explained below, more than one of the pairs of electrical components may be connected in series in a detection circuit, so that electrical energy fed towards a first electrical component of one of the pairs may pass one or more other pairs before reaching the first electrical component, and electrical energy received at the second terminal from a second electrical component of one of the pairs may pass one or more of the other pairs before reaching the second terminal.

In this embodiment, the pairs of electrical components are arranged such that, for each detection circuit, the electrical energy received at the second terminal during the predetermined synchronous movement of the flight control surfaces between the retracted position and the extended position is above a predetermined threshold, which may be fixed at the time of manufacturing or may be adjustable. The received electrical energy is then the electrical parameter. The threshold may be an absolute threshold or a threshold depending on the electrical energy fed from the first terminal towards the first electrical component, e.g. a threshold of the ratio of fed to received energy. In any case, the threshold can be chosen to allow for slight deviations from the normal operating state due to normal forces occurring during flight, such as, e.g., vibrations or bending of the wings, without falling below the threshold. The control unit is adapted or configured to determine, for each detection circuit, whether the electrical energy received at the second terminal is below the threshold during operation of the drive arrangement and to control the drive arrangement to stop movement of the flight control surfaces when the received electrical energy is below the threshold. If the received electrical energy falls below the threshold this is taken as an indication of a fault state caused, for example, by one of the flight control surfaces, such as slats, being skewed. Stop movement of the flight control surfaces may in the simplest case be effected by stopping and preferably locking the drive arrangement.

Generally, independent of this specific embodiment, a separate detection circuit may be provided for each of the pairs of electrical components, a single detection circuit may be provided for all of the pairs, or an intermediate configuration may be provided for. It should be noted that it is generally also possible to couple two or more of the detection circuits in parallel between a single pair of first and second terminals.

In any case, the above configurations are very simple and utilize only a small number of detectors in the form of the pairs of electrical components for a reliable detection of a fault state of the flight control surface assembly. For example, skewing of a flight control surface, such as a slat, can be reliably detected. As compared to mechanical solutions for preventing excessive deviations from the predetermined synchronous movement and, in particular, skewing of a flight control surface or slat, the weight of the assembly is considerably reduced. Due to the use of only a small number of detectors, the number of cables for connection to the control unit can be kept small, further reducing the weight of the assembly. Further, the overall reliability is maintained high as compared to conceivable configurations utilizing a larger number of detectors, because with an increasing number of detectors the failure probability likewise increases. The assembly also has the advantage that it is very simple to produce, because the detectors can already be integrated into or mounted to the individual flight control surfaces during their production, and that it requires little or no maintenance, because there is no mechanical wear.

In a preferred embodiment, the flight control surfaces are trailing edge flight control surfaces.

In an alternative preferred embodiment, the flight control surfaces are leading edge flight control surfaces and, preferably, slats. In the case of the flight control surfaces being slats, the connection assembly may preferably comprise, for each of the slats, at least one elongate slat track which is adapted or configured to be mounted to the main wing movably along a track longitudinal axis, and which is connected to the respective slat. In that case it is further preferable if for each of the slat tracks the drive arrangement comprises a drive pinion engaging the slat track.

In a preferred embodiment, the pairs of electrical components are arranged and, for each detection circuit, the threshold is selected such that the measured value of the electrical parameter is outside the predetermined range beyond the threshold—for example, the electrical energy received at the second terminal decreases below the threshold in the specific embodiment described above—during operation of the drive arrangement if a predetermined minimum deviation of the relative arrangement between the first electrical component and the second electrical component of at least one of the pairs of electrical components included in the respective detection circuit from the relative arrangement during the predetermined synchronous movement is exceeded. Such predetermined minimum deviation of the relative arrangement between the first electrical component and the second electrical component of at least one of the pairs of electrical components corresponds—or is interpreted to correspond—to a predetermined minimum deviation of at least one of the flight control surfaces associated with the respective detection circuit (i.e., one of the flight control surfaces to which one of the first and second electrical components of one of the pairs of electrical components of the detection circuit is fixedly mounted) from the predetermined synchronous movement. Of course, in the case of multiple of the pairs connected in series or in a sequence in a detection circuit, only the sum of all losses in the energy transfer in all of the pairs is detected. In any case, if falling outside the predetermined range beyond the threshold—for example falling below the threshold in the specific example described above—is not achieved if the relative arrangement of a single one of the pairs deviates from the relative arrangement defined by the predetermined synchronous movement by not more than a certain maximum, normal deviations of the above-described type occurring during normal operation of the aircraft and the flight control surface assembly do not cause incorrect detection of a fault state, thereby increasing the robustness of the detection.

In this embodiment it is further preferable if the predetermined minimum deviation of the relative arrangement comprises—or is constituted by—a translational component in a plane perpendicular to a gap width direction of the respective gap and/or a rotational component. In particular, a change of the relative arrangement by displacement of the first and second electrical components in a gap width direction preferably does not cause exceeding the predetermined minimum deviation, because wing bending occurring during normal flight causes the individual flight control surfaces to move away and towards each other, i.e. the gaps to increase and decrease, depending on the current shape of the wing. This difference in sensitivity between displacement perpendicular to the gap width direction or rotational displacement on the one hand and displacement along the gap width direction can be advantageously implemented by adapting the characteristics of the first and second components such that the energy transfer is less sensitive to changes of the gap width.

In a preferred embodiment, for each of the pairs of electrical components the first and second electrical components are arranged at the facing lateral edges of the respective two adjacent flight control surfaces.

In a preferred embodiment, for each of the pairs of electrical components the first and second electrical components comprise or are capacitive components adapted or configured for capacitively coupling electrical energy from the first electrical component to the second electrical component to effect the wireless transfer of electrical energy. In an alternative preferred embodiment, for each of the pairs of electrical components the first and second electrical components comprise or are inductive components—or inductors—adapted or configured for inductively coupling electrical energy from the first electrical component to the second electrical component to effect the wireless transfer of electrical energy. Due to the use of such electrically passive components the reliability of the assembly can be advantageously further increased.

In embodiments utilizing inductive components in or as the first and second electrical components each of the inductive components may be a coil or comprise a coil and preferably also a ferrite element. By suitably selecting and adapting the shape of the coil and/or of the ferrite element it is easily possible to selectively obtain a wide range of different coupling characteristics. For example, shape and dimensions can be chosen such that in operation the magnetic field generated by the first electrical component is configured such that the second electrical component does not see a change or does not see a significant change during normal movements of the respective flight control surfaces in the gap width direction, but is very sensitive to displacement perpendicular to a gap width direction causing misalignment of the axes of the coils or to rotational displacement in which the axes of the coils are rotated with respect to each other.

In a preferred embodiment, for each of the at least one detection circuit the one or more pairs included in the respective detection circuit are arranged one after the other in a sequence—or in a daisy chain arrangement—from a first one of the one or more pairs included in the respective detection circuit to a last one of the one or more pairs included in the respective detection circuit. It is to be noted that the last pair is identical to the first pair if there is only a single pair in the detection circuit, i.e. in that case the sequence consists of only a single pair. In any case, the arrangement is such that the first electrical component of the first pair is electrically connected by a wired first electrical connection to the first terminal of the control unit. The control unit is adapted or configured to feed electrical energy to the first electrical component of the first pair included in the respective detection circuit using the first terminal and possibly the second terminal. The first electrical component of any further one of the one or more pairs included in the respective detection circuit in the sequence is electrically connected by a respective wired second electrical connection to the second electrical component of the preceding pair in the sequence. It should be noted that if the first and second electrical components comprise or are capacitive components adapted or configured for capacitively coupling electrical energy from the first electrical component to the second electrical component to effect the wireless transfer of electrical energy, the second electrical connection preferably comprises a single electrical conduit. On the other hand, if the first and second electrical components comprise or are inductive components adapted or configured for inductively coupling electrical energy from the first electrical component to the second electrical component to effect the wireless transfer of electrical energy, the second electrical connection comprises two electrical conduits connected to different ones of two terminals of the respective inductive components, such as to opposite ends of coils constituting the inductive components.

In a first variant of this embodiment it is further preferred if, for each of the at least one detection circuit, the second electrical component of the last pair—which is identical to the first pair if the detection circuit includes only a single one of the pairs, as already noted above—is electrically connected by a wired third electrical connection to the second terminal of the control unit. This first variant may be utilized to implement the above-described embodiment in which the electrical parameter is the electrical energy received at the second terminal. Thus, the electrical parameter is the electrical energy received at the second terminal upon feeding electrical energy to the first electrical component of the first pair included in the respective detection circuit using the first terminal, and the threshold limits the predetermined range at a lower end thereof. The electrical energy fed to the first pair is passed along the sequence to the last pair and from there to the control unit. It should be noted that if the first and second electrical components comprise or are capacitive components adapted or configured for capacitively coupling electrical energy from the first electrical component to the second electrical component to effect the wireless transfer of electrical energy, the first and third electrical connections preferably each comprise a single electrical conduit and the first and second terminals preferably each comprise a single pole. For example the first terminal may be a first pole of an alternating current source and the second terminal may be a second pole of an alternating current source. On the other hand, if the first and second electrical components comprise or are inductive components adapted or configured for inductively coupling electrical energy from the first electrical component to the second electrical component to effect the wireless transfer of electrical energy, the first and third electrical connections each comprise two electrical conduits connected to different ones of two terminals of the respective inductive components, such as to opposite ends of coils constituting the inductive components, and the first and second terminals each comprise two poles to which the two electrical conduits are connected. For example the first terminal may comprise two poles of an alternating current source.

As already noted, this first variant may be utilized to implement the above-described embodiment in which the electrical parameter is the electrical energy received at the second terminal. Then, for each pair of electrical components the first electrical component and the second electrical component are electrically connected in series in the respective detection circuit between the first and second terminals to which the respective detection circuit is connected, and the control unit is adapted or configured to feed electrical energy from the first terminal towards the first electrical component and receive at the second terminal electrical energy from the second electrical component. Further, for each of the detection circuits, the electrical parameter is the electrical energy received at the second terminal upon feeding electrical energy from the first terminal towards the first electrical component, and the threshold limits the predetermined range at a lower end thereof. Thus, the range and the threshold are defined such that during the predetermined synchronous movement of the flight control surfaces the measure value of the electrical parameter, i.e. the electrical energy received at the second terminal, is above the threshold, and the control unit is adapted or configured to determine whether the measured value is below the threshold during operation of the drive arrangement and to control the drive arrangement to stop movement of the flight control surfaces when the measured value is below the threshold.

In a second variant of the embodiment it is preferred if, for each of the at least one detection circuit, the second electrical component of the last pair—which is identical to the first pair if the detection circuit includes only a single one of the pairs, as already mentioned above—is electrically connected to a third electrical component to form a first passive resonant circuit. Thus, if the second electrical component of the last pair comprises or is a capacitive component the third electrical component comprises or is an inductive component, and if the second electrical component of the last pair comprises or is an inductive component the third electrical component comprises or is a capacitive component. In any case, this has the effect that the entire respective detection circuit forms a second passive resonant circuit having a resonance frequency which depends on the relative arrangement between the first electrical component and the second electrical component of each of the pairs included in the respective detection circuit. Consequently, the resonance frequency of the second passive resonant circuit changes upon a change in the relative arrangement of the first and second electrical components of any of the pairs included in the respective detection circuit.

In this second variant the control unit is adapted or configured to feed electrical energy to the first electrical component of the first pair included in the respective detection circuit using the first terminal in the form of an alternating current having a predetermined supply frequency. The supply frequency is equal to the resonance frequency corresponding to the predetermined synchronous movement of the flight control surfaces or lies within a predetermined interval about the resonance frequency corresponding to the predetermined synchronous movement of the flight control surfaces. In this regard, the resonance frequency corresponding to the predetermined synchronous movement of the flight control surfaces is the resonance frequency when the first and second electrical components of the pairs included in the detection circuit have the relative arrangement they assume or maintain during the predetermined synchronous movement of the flight control surfaces.

Further, in this second variant the electrical parameter is a parameter characteristic of the electrical impedance of the second passive resonant circuit. Thus, the electrical parameter is the electrical impedance itself or a parameter depending on the electrical impedance, such as a current. It is particularly preferred if the first and second electrical components comprise or are inductive components and if the first electrical component of the first pair is electrically connected by a wired first electrical connection to the first terminal and the second terminal of the control unit, wherein the control unit is adapted or configured to feed electrical energy to the first electrical component of the first pair included in the respective detection circuit using the first and second terminals. Thus, in this case each of the first and second terminals is a different pole of an alternating current source adapted or configured to feed the alternating electrical current.

This second variant provides the advantage that a wired electrical connection between the control unit and the detection circuit is only necessary at one of the flight control surfaces. This is because only the first electrical connection must be provided. Therefore, any measures taking into consideration the movement of the flight control surfaces can be limited to one flight control surface per detection circuit.

In a preferred embodiment, for each of the pairs of electrical components there is a separate detection circuit and the control unit comprises separate first and second terminals. This allows detecting the location of a fault in a fault state. In an alternative preferred embodiment there is a single detection circuit for all of the pairs of electrical components, wherein in embodiments in which multiple pairs are electrically connected in series between the first and second terminals all of the pairs of electrical components are electrically connected in series in the detection circuit between the first terminal and the second terminal of the control unit. This configuration is particularly simple to implement. Of course, as already noted above, it is also possible to use any intermediate configuration in which more than one and less than all of the pairs of electrical component are included in at least one of the detection circuits.

According to the disclosure herein a wing of an aircraft is also provided, which wing comprises a main wing and a flight control surface assembly having the above-described configuration. The flight control surface assembly is mounted to the main wing by the connection assembly in the manner already described above. The drive arrangement is operable to effect the predetermined synchronous movement of the flight control surfaces with respect to the main wing between the retracted position and the extended position.

The disclosure herein also provides an aircraft comprising such a wing.

BRIEF DESCRIPTION OF THE DRAWINGS

In the following an exemplary embodiment of the slat assembly and of a wing including the slat assembly will be described in more detail with reference to the example drawings.

FIG. 2a shows a schematic block diagram of a first embodiment of a flight control surface assembly of the disclosure herein in a normal operating state.

FIG. 4a shows a schematic block diagram of a third embodiment of a flight control surface assembly of the disclosure herein in a normal operating state.

FIG. 4b shows a schematic block diagram of the third embodiment of the flight control surface assembly in a fault state.

DETAILED DESCRIPTION

Figure 1:
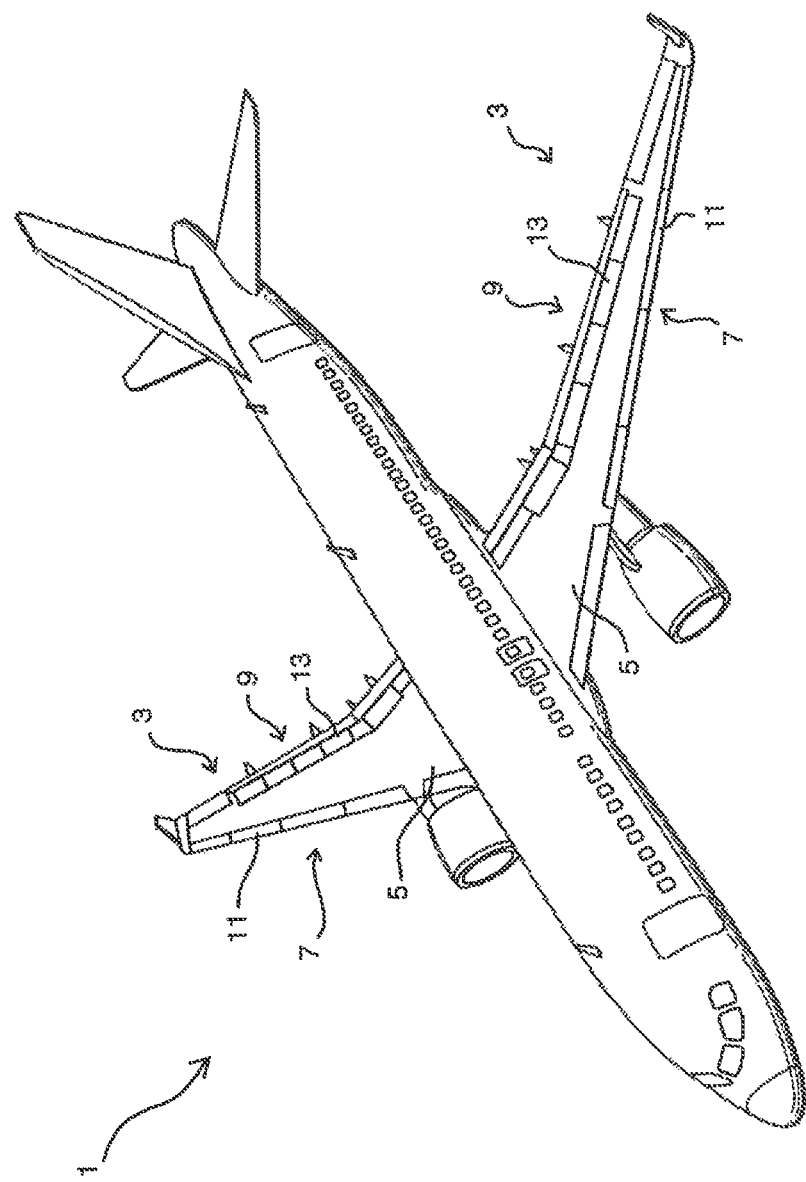
FIG. 1 shows a schematic perspective view of an aircraft with wings comprising a flight control surface assembly according to the disclosure herein, wherein the flight control surfaces are shown in the retracted or stowed position.

In FIG. 1 an aircraft 1 comprising two wings 3 is shown. Each of the wings 3 comprises a main wing 5 and two flight control surface assemblies, namely a leading edge flight control surface assembly in the form of a slat assembly 7, and a trailing edge flight control surface assembly in the form of a flap assembly 9. Each of the slat assemblies 7 comprises four slats 11, which are arranged side by side in a row, and each of the flap assemblies 9 comprises four flaps 13, which are likewise arranged side by side in a row. In FIG. 1 the slats 11 and flaps 13 are shown in a retracted or stowed position in which the leading edges of the slats 11 are essentially aligned with the leading edges of the main wings 5 and the trailing edges of the flaps 13 are essentially aligned with the trailing edges of the main wings 5. The arrow 2 indicates the flight direction, i.e. when moving the slats 11 into the extended position they are moved with respect to the main wing 5 in the flight direction 2, and when moving the slats 11 into the retracted position they are moved with respect to the main wing 5 against the flight direction 2. The slats 11 and flaps 13 or each of the assemblies 7, 9 are mounted to the respective main wing 5 such that they can be driven to carry out a predetermined synchronously movement between the retracted position and an extended or deployed position (not shown).

Figure 2B:
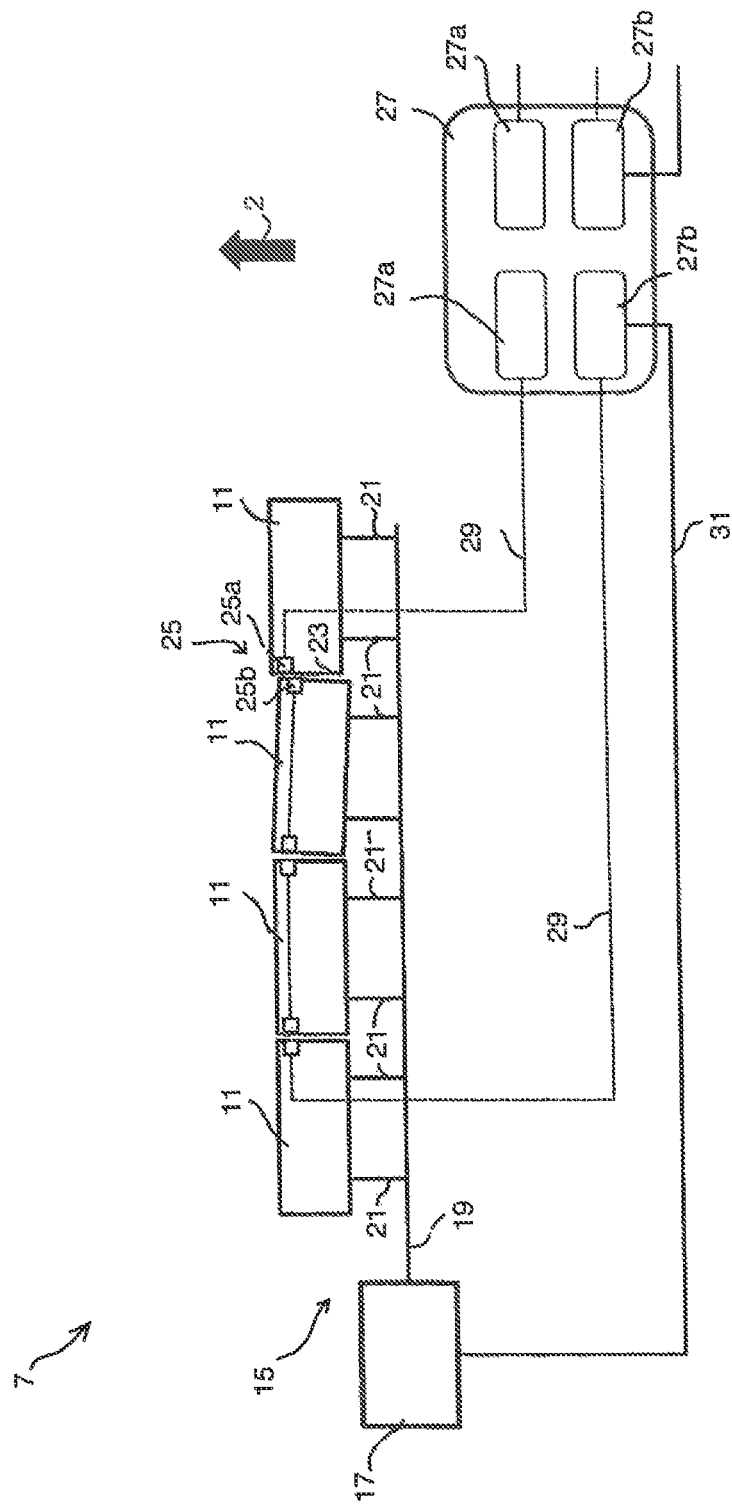
FIG. 2b shows a schematic block diagram of the first embodiment of the flight control surface assembly in a fault state.

For this purpose, as schematically illustrated in FIGS. 2a and 2b, which show a first embodiment of a slat assembly 7, for the example of one of the slat assemblies 7, a drive arrangement 15 is provided, which includes a rotary actuator 17 and a rotatable drive shaft 19 driven by the rotary actuator 17. Each of the slats 11 is mounted to the respective main wing 5 by two elongate arcuate slat tracks or support elements 21, which are extending parallel to each other and are spaced from each other in the spanwise direction of the respective slat 11. The two planes associated with the two slat tracks 21 are parallel to each other. A distal end of each of the slat tracks 21 is connected to the associated slat 11. The slat tracks 21 each extend into the main wing 5 and are mounted in the main wing 5 to be movable along an arc in the respective planes and defined by the arcuate shape of the slat track 21 between the retracted position, in which the slat 11 is in its stowed position, and an extended position, in which the slat 11 is in its deployed position. Upon operation of the rotary actuator 17 the drive shaft 19 is driven to rotate, thereby effecting movement of the slat tracks 11 and, thereby, the slats 11 between the extended and retracted positions.

Importantly, upon operation of the actuator 17 the slat tracks 21 define a predetermined synchronous movement of the slats 11 during which each of the slats 11 moves along a predetermined path having a predetermined relative position and orientation with respect to the other slats 11. For example, throughout the movement between the retracted and extended positions the slats 11 may maintain or essentially maintain their relative arrangement shown in FIG. 2a. However, it is to be noted that slight deviations from this predetermined synchronous movement typically occur due to forces occurring during normal flight, as already explained above.

Each of the slats 11 has two opposite lateral edges 11a, 11b, and the slates 11 are arranged in a row with lateral edges 11a, 11b of each two adjacent slats 11 facing each other and each two adjacent slats 11 being spaced from each other by a gap 23. For each of the gaps 23 a pair 25 of inductors 25a, 25b is provided, including a first inductor in the form of a coil 25a, which is mounted in a fixed position and orientation on the slat 11 on the right hand side of the respective gap 23 in the Figure, and a second inductor in the form of a coil 25b, which is mounted in a fixed position and orientation on the slat on the left hand side of the respective gap 23. Each of the coils 25a, 25b may preferably include a ferrite core. Further, for each of the gaps 23 the fixed position and orientation of the respective first and second inductors 25a, 25b is such that during the predetermined synchronous movement the longitudinal axes of the coils 25a, 25b are aligned with each other.

All of the pairs 25 of coils 25a, 25b are connected in series between a first terminal 27a and a second terminal 27b of a control unit 27 by suitably wiring 29. The control unit 27, which controls the operation of the actuator 17 and is connected to the actuator 17 for this purpose, is adapted or configured to output at the first terminal 27a electrical energy in the form of alternating current and to receive at the second terminal 27b electrical energy in the form of alternating current. The alternating current is fed to the first coil 25a of the rightwardmost pair 25 of coils via two conduits 29 (illustrated as a single first electrical connection) and generates a changing magnetic field which induces alternating current in the second coil 25b of the pair 25. This inductive transfer of electrical energy is high due to the aligned axes of the coils. The electrical energy then reaches via two conduits illustrated as a single second electrical connection the pair 25 of the middle gap 23 and finally via two conduits illustrated as a single second electrical connection the leftwardmost pair 25 before being received at the second terminal 27b via two conduits 29 (again illustrated as a single third electrical connection). The first terminal 27a comprises two poles of an alternating current source, wherein the two conduits 29 of the first electrical connection are connected to these two poles. The control unit 27 is adapted or configured to detect the amount of electrical energy received at the second terminal 27b, which again comprises two poles, similar to the case of the first terminal 27a. This amount will be lower than the electrical energy emitted by the first terminal 27a, because there will be some loss during the inductive energy transfer. The control unit 27 also comprises an additional pair of first and second terminals 27a, 27b for the slat assembly 7 on the other wing 3 (not shown).

FIG. 2b schematically illustrates a fault state of the slat assembly 7 of FIG. 2a. In the fault state one of the slats 11 is skewed with respect to the other slats 11 and therefore significantly deviates from the predetermined synchronous movement during operation of the actuator 17. Due to the skewed position of the slat 11, the relative arrangement between the first and second coils 25a, 25b of the rightwardmost pair 25 has changed. This deviation in the relative arrangement causes misalignment of the coil axes and, therefore, a decrease of the inductive coupling of the two coils 25a, 25b. Therefore, the control unit 27 detects a decrease of the electrical energy received at the second terminal 27b.

The control unit 27 is adapted or configured to monitor the electrical energy received at the second terminal 27b during operation of the actuator 17 and to compare the amount of the received electrical energy against a threshold. The threshold is chosen such that slight deviations of the slats 11 from the predetermined synchronous movement occurring during normal flight do not cause the amount of the received electrical energy to fall below the threshold, but that skewing or another minimum deviation corresponding to a fault state causes falling below the threshold. Upon detecting that the received electrical energy falls below the threshold the control unit 27 outputs via control line 31 a control signal to the actuator 17, which control signal controls the actuator 17 to stop actuation, thereby stopping further movement of the slats 11.

Figure 3:
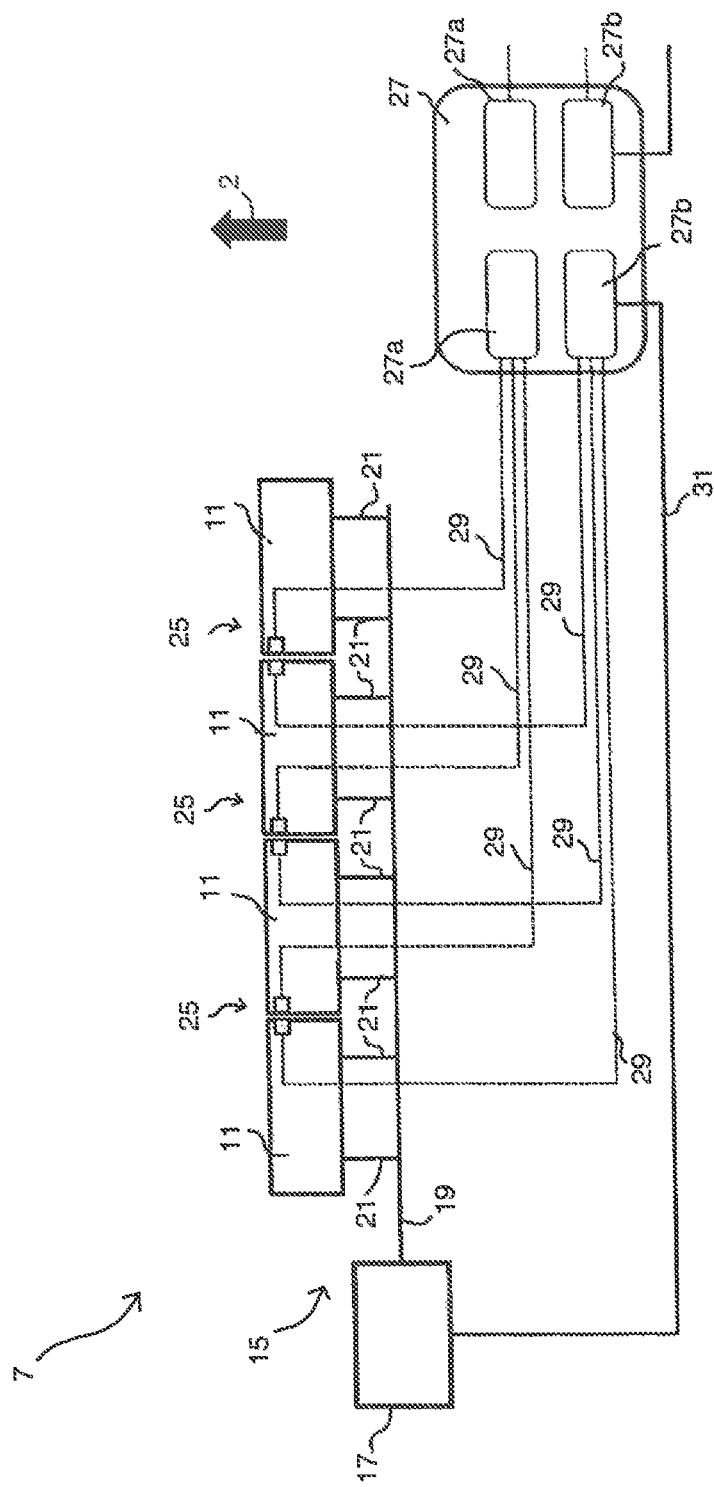
FIG. 3 shows a schematic block diagram of a second embodiment of a flight control surface assembly of the disclosure herein in a normal operating state.

FIG. 3 illustrates an alternative embodiment of the slat assembly 7 in the normal operating state. The embodiment of FIG. 3 largely corresponds to the embodiment of FIGS. 2a and 2b. However, different from the embodiment of FIGS. 2a and 2b each of the pairs 25 of first and second coils 25a, 25b is separately connected to a separate pair of first and second terminals 27a, 27b of the control unit 27. In FIG. 3 the reference numerals 27a and 27b designate a group of first terminals 27a and a group of second terminals 27b, respectively. The operation of the slat assembly 7 of FIG. 3 is identical to the operation of the slat assembly 7 of FIGS. 2a and 2b, with the exception that the control unit 27 separately feeds electrical energy to and receives electrical energy from each pair 25 and separately detects whether the received electrical energy is below a threshold. In this manner, the location of any fault in a fault state can be localized.

FIGS. 4a and 4b illustrate a further alternative embodiment of the slat assembly 7 in the normal operating state and in a fault state, respectively. The embodiment of FIGS. 4a and 4b largely corresponds to the embodiment of FIGS. 2a and 2b. However, different from the embodiment of FIGS. 2a and 2b, there is no wired third electrical connection between the leftwardmost pair 25 and the control unit 27. Rather, the first terminal 27a is one pole of an alternating current source and the second terminal 27b is a second pole of the alternating current source, and the two conduits 29 of the first electrical connection are connected to the first terminal 27a and the second terminal 27b, respectively. Instead of the third electrical connection, the second coil 25b of the leftwardmost pair 25 is connected to a capacitor 37 to form a first passive resonant circuit 35. In this manner, the entire arrangement of pairs 25, including the capacitor 37, forms a second passive resonant circuit having a resonance frequency, which depends on the relative arrangement of the first and second coils 25a, 25b in each of the pairs 25. The alternating electric current fed by the control unit 27 has a supply frequency which is identical or essentially identical to the resonant frequency in the case in which there are no deviations of the slats 11 from the predetermined synchronous movement occurring during normal flight. The control unit 27 is adapted or configured to measure the impedance of the latter passive resonant circuit, and instead of detecting received electrical energy the control unit 27 is adapted or configured to detect whether the measured impedance exceeds or falls below a threshold indicating a fault state, e.g. excessive deviations of one of the slats 11 from the predetermined synchronous movement occurring during normal flight.

The subject matter disclosed herein can be implemented with or in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the invention(s) herein is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A flight control surface assembly for mounting to a main wing of an aircraft and comprising:
   a plurality of flight control surfaces each having two opposite lateral edges, wherein the flight control surfaces are arranged side by side, such that, for each two adjacent ones of the flight control surfaces, one of the lateral edges of one of respective two adjacent flight control surfaces faces one of the lateral edges of the other of the respective two adjacent flight control surfaces and the two respective adjacent flight control surfaces are separated by a gap;
   a connection assembly for movably connecting the plurality of flight control surfaces to a main wing of an aircraft, such that the flight control surfaces are selectively movable in a predetermined synchronous movement between a retracted position and an extended position;
   a drive arrangement operatively coupled to the connection assembly and operable to effect the predetermined synchronous movement of the flight control surfaces between the retracted position and the extended position; and
   a control unit connected to the drive arrangement and configured to control operation of the drive arrangement;
   the flight control surface assembly further comprising for each of the gaps a separate pair of electrical components comprising a first electrical component fixedly mounted to one of the flight control surfaces separated by a respective gap and a second electrical component fixedly mounted to the other one of the flight control surfaces separated by the respective gap, wherein the first and second electrical components of each pair are configured to wirelessly transfer electrical energy over the gap from the first electrical component to the second electrical component, wherein the amount of electrical energy transferred depends on a relative arrangement between the first electrical component and the second electrical component;
   the flight control surface assembly further comprising at least one detection circuit, wherein each of the pairs is included in an associated one of the at least one detection circuit and each of the at least one detection circuit includes one or more of the pairs;
   wherein each of the at least one detection circuit is electrically connected to a first terminal and a second terminal of the control unit, and the control unit is configured to feed electrical energy to the detection circuit using the first terminal such that electrical energy is then wirelessly transferred between the first and second electrical components of each of the pairs included in a respective detection circuit;

wherein the control unit is configured to measure, for each of the at least one detection circuit and upon feeding electrical energy to the respective detection circuit, a value of an electrical parameter which depends on the relative arrangement between the first electrical component and the second electrical component of each of the pairs included in the respective detection circuit; and wherein the pairs of electrical components are arranged such that, for each detection circuit, during the predetermined synchronous movement of the flight control surfaces the measured value of the electrical parameter is in a predetermined range limited at one end by a threshold, and the control unit is configured to determine whether the measured value of the electrical parameter is outside the predetermined range beyond the threshold during operation of the drive arrangement and to control the drive arrangement to stop movement of the flight control surfaces when the measured value of the electrical parameter is outside the predetermined range beyond the threshold.

2. The flight control surface assembly according to claim 1, wherein the pairs of electrical components are arranged and, for each detection circuit, the threshold is selected such that the measured value of the electrical parameter is outside the predetermined range beyond the threshold during operation of the drive arrangement if a predetermined minimum deviation of the relative arrangement between the first electrical component and the second electrical component of at least one of the pairs of electrical components included in the respective detection circuit from relative arrangement during the predetermined synchronous movement is exceeded.

3. The flight control surface assembly according to claim 2, wherein the predetermined minimum deviation of the relative arrangement comprises a translational component in a plane perpendicular to a gap width direction and/or a rotational component.

4. The flight control surface assembly according to claim 1, wherein for each of the pairs of electrical components the first and second electrical components are arranged at facing lateral edges of the respective two adjacent flight control surfaces.

5. The flight control surface assembly according to claim 1, wherein for each of the pairs of electrical components the first and second electrical components comprise or are capacitive components configured for capacitively coupling electrical energy from the first electrical component to the second electrical component to effect the wireless transfer of electrical energy.

6. The flight control surface assembly according to claim 1, wherein for each of the pairs of electrical components the first and second electrical components comprise or are inductive components configured for inductively coupling electrical energy from the first electrical component to the second electrical component to effect the wireless transfer of electrical energy.

7. The flight control surface assembly according to claim 6, wherein each of the inductive components comprises a coil and a ferrite core.

8. The flight control surface assembly according to claim 1, wherein for each of the at least one detection circuit the one or more pairs are arranged one after another in a sequence from a first one of the one or more pairs to a last one of the one or more pairs such that:
the first electrical component of the first pair is electrically connected by a wired first electrical connection to the first terminal of the control unit, wherein the control unit is configured to feed electrical energy to the first electrical component of the first pair using the first terminal; and
the first electrical component of any further one of the one or more pairs in the sequence is electrically connected by a respective wired second electrical connection to the second electrical component of a preceding pair in the sequence.

9. The flight control surface assembly according to claim 8, wherein, for each of the at least one detection circuit, the second electrical component of the last pair is electrically connected by a wired third electrical connection to the second terminal of the control unit, and the electrical parameter is the electrical energy received at the second terminal and the threshold limits the predetermined range at a lower end thereof.

10. The flight control surface assembly according to claim 8, wherein, for each of the at least one detection circuit:
the second electrical component of the last pair is electrically connected to a third electrical component to form a first passive resonant circuit, so that the entire respective detection circuit forms a second passive resonant circuit having a resonance frequency which depends on the relative arrangement between the first electrical component and the second electrical component of each of the pairs included in the respective detection circuit;
the control unit is configured to feed electrical energy to the first electrical component of the first pair using the first terminal in the form of an alternating current having a predetermined supply frequency which is equal to the resonance frequency corresponding to the predetermined synchronous movement of the flight control surfaces or lies within a predetermined interval about the resonance frequency corresponding to the predetermined synchronous movement of the flight control surfaces; and
the electrical parameter is a parameter characteristic of the electrical impedance of the second passive resonant circuit.

11. The flight control surface assembly according to claim 1, wherein for each pair of electrical components the first electrical component and the second electrical component are electrically connected in series in the respective detection circuit between the first and second terminals to which the respective detection circuit is connected, and the control unit is configured to feed electrical energy from the first terminal towards the first electrical component and receive at the second terminal electrical energy from the second electrical component,
wherein, for each of the detection circuits, the electrical parameter is the electrical energy received at the second terminal and the threshold limits the predetermined range at a lower end thereof.

12. The flight control surface assembly according to claim 1, wherein for each of the pairs of electrical components there is a separate detection circuit and the control unit comprises separate first and second terminals.

13. The flight control surface assembly according to claim 1, comprising a single detection circuit for all of the pairs of electrical components.

14. A wing of an aircraft comprising a main wing and a flight control surface assembly, the flight control surface assembly comprising:
a plurality of flight control surfaces each having two opposite lateral edges, wherein the flight control surfaces are arranged side by side, such that, for each two adjacent ones of the flight control surfaces, one of the lateral edges of one of respective two adjacent flight control surfaces faces one of the lateral edges of the other of the respective two adjacent flight control surfaces and the two respective adjacent flight control surfaces are separated by a gap;

a connection assembly for movably connecting the plurality of flight control surfaces to a main wing of an aircraft, such that the flight control surfaces are selectively movable in a predetermined synchronous movement between a retracted position and an extended position;

a drive arrangement operatively coupled to the connection assembly and operable to effect the predetermined synchronous movement of the flight control surfaces between the retracted position and the extended position; and a control unit connected to the drive arrangement and configured to control operation of the drive arrangement;

the flight control surface assembly further comprising for each of the gaps a separate pair of electrical components comprising a first electrical component fixedly mounted to one of the flight control surfaces separated by a respective gap and a second electrical component fixedly mounted to the other one of the flight control surfaces separated by the respective gap, wherein the first and second electrical components of each pair are configured to wirelessly transfer electrical energy over the gap from the first electrical component to the second electrical component, wherein the amount of electrical energy transferred depends on a relative arrangement between the first electrical component and the second electrical component;

the flight control surface assembly further comprising at least one detection circuit, wherein each of the pairs is included in an associated one of the at least one detection circuit and each of the at least one detection circuit includes one or more of the pairs;

wherein each of the at least one detection circuit is electrically connected to a first terminal and a second terminal of the control unit, and the control unit is configured to feed electrical energy to the detection circuit using the first terminal such that electrical energy is then wirelessly transferred between the first and second electrical components of each of the pairs included in a respective detection circuit;

wherein the control unit is configured to measure, for each of the at least one detection circuit and upon feeding electrical energy to the respective detection circuit, a value of an electrical parameter which depends on the relative arrangement between the first electrical component and the second electrical component of each of the pairs included in the respective detection circuit; and wherein the pairs of electrical components are arranged such that, for each detection circuit, during the predetermined synchronous movement of the flight control surfaces the measured value of the electrical parameter is in a predetermined range limited at one end by a threshold, and the control unit is configured to determine whether the measured value of the electrical parameter is outside the predetermined range beyond the threshold during operation of the drive arrangement and to control the drive arrangement to stop movement of the flight control surfaces when the measured value of the electrical parameter is outside the predetermined range beyond the threshold; and the flight control surface assembly being mounted to the main wing by the connection assembly such that the drive arrangement is operable to effect the predetermined synchronous movement of the flight control surfaces with respect to the main wing between the retracted position and the extended position.

15. An aircraft comprising a wing according to claim 14.

* * * * *